United States Patent [19]
Langlois

[11] 3,871,234
[45] Mar. 18, 1975

[54] DYNAMIC BALANCING MACHINE
[75] Inventor: Christian Langlois, Castres, France
[73] Assignee: Regie Nationale des Usines Renault, Billancourt, France
[22] Filed: Sept. 11, 1973
[21] Appl. No.: 396,142

[30] Foreign Application Priority Data
Dec. 10, 1972 France .............................. 72.36177

[52] U.S. Cl. .................................... 73/460, 73/468
[51] Int. Cl. ........................ G01m 1/16, G01m 1/20
[58] Field of Search ............. 73/458, 461, 468, 487, 73/460

[56] References Cited
FOREIGN PATENTS OR APPLICATIONS
280,380  11/1927   United Kingdom ............... 73/468

Primary Examiner—James J. Gill
Attorney, Agent, or Firm—Clelle W. Upchurch

[57] ABSTRACT

A dynamic balancing machine for particular use in balancing engine crank-shafts, comprising components to simulate imbalancing effects to which the crank-shaft will be subjected in use, and means for adjusting the position of at least one of the imbalance simulating components to allow the machine to be used on different types of crank-shaft with rapid convertibility.

7 Claims, 8 Drawing Figures

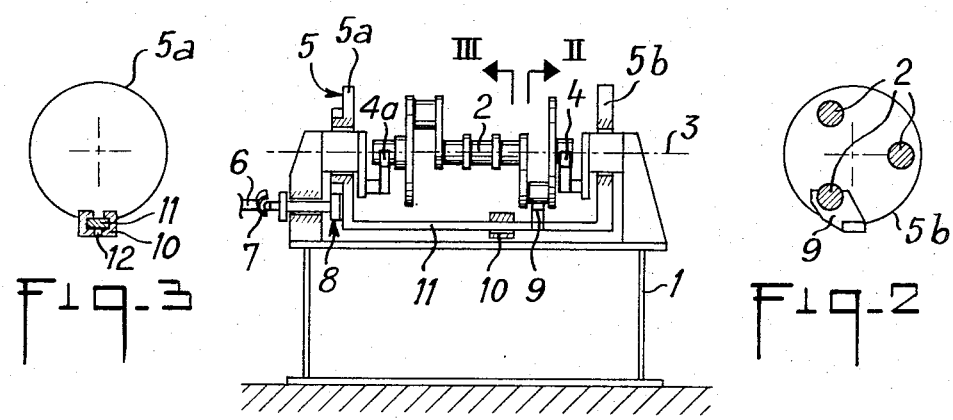
Fig-3 Fig-1 Fig-2
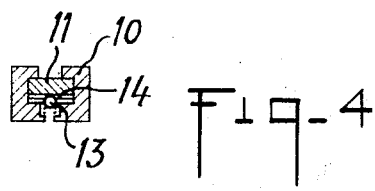
Fig-4
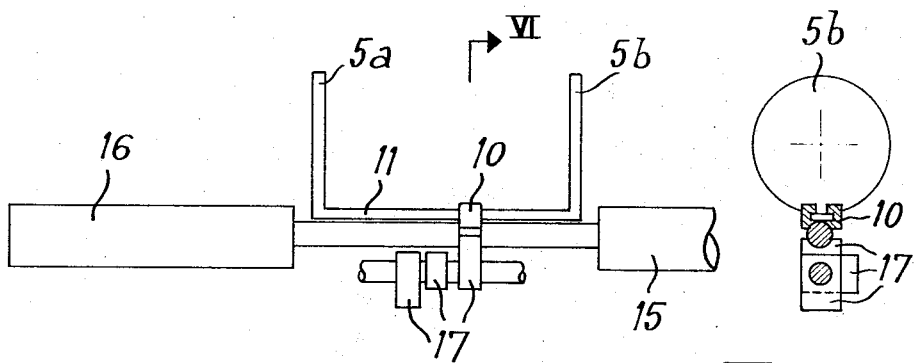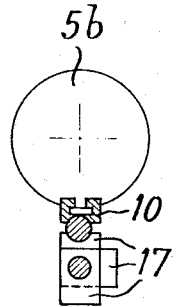
Fig-5 Fig-6

DYNAMIC BALANCING MACHINE

The present invention relates to a balancing machine of the type comprising a base support on which a part to be balanced can be rotated with its axis of rotation free to move in a plane called the clearance plane.

A known machine of this type employs two components generating imbalance to simulate the presence of co-pending components with which the part to be balanced will be used. Each such component consists of a mass mounted off-centre to rotate on an axis firmly fixed to the base support. These masses are driven synchronously with the part to be balanced with their axes of rotation parallel to one another, and are adjusted relative to one another in such a way as to be in opposed phases at least when the planes containing the axes of rotation and centres of gravity of the respective masses become parallel to one another.

In such a machine, the function of the adjustable masses is to apply during the balancing operation, a simulated dynamic imbalance to the part to be balanced. More particularly, where the part to be balanced is a crank-shaft, the adjustable masses apply to the crank-shaft two equal simulation imbalances in opposed phases displaced longitudinally on the axis of the crank-shaft, the two inbalances simulating the presence of the connecting-rod bearings on the crank-shaft.

In an engine, the assembly of crank-shaft and the connecting-rod bearings must be balanced dynamically and it is accepted that masses of the same value placed on the crank-pins of the crank-shaft can simulate the connecting-rod bearings to an adequate approximation.

For certain engines, as is the case of four cylinders in in-line configuration, the connecting-rod bearings are balanced dynamically and no simulation mass has to be introduced for balancing the crank-shafts.

For other engines, the combination of these simulation masses which will be statically balanced, will still need to be dynamically balanced, that is to say that the combination will be equivalent to two equal imbalances in opposed phases, displaced longitudinally on the axis of the crank-shaft.

Balancing machines are known in which the crank-shaft is carried by a support in the form of a cradle centred on the axis of rotation of the said crank-shaft and in which masses placed on sideplates of this cradle make it possible to simulate the dynamic imbalance due to the connecting-rod bearings. In their present form, these known machines are not suitable for rapidly changing the value or position of these masses. This makes it difficult to balance crank-shafts of different dimensions one after the other on the same balancing machine, as is often necessary in practice.

The invention aims to overcome this disadvantage and to produce a machine for dynamically balancing parts such as crank-shafts which makes it possible rapidly to adjust to a predetermined value the simulation dynamic imbalance applied to the said crank-shaft, thus allowing crank-shafts of different paths to be passed alternately on the said machine.

According to the present invention there is provided a dynamic balancing machine comprising means for supporting a part to be balanced and driving it for rotation about an axis while allowing lateral movement in a plane called the clearance plane; two components for generating imbalance and each consisting of a mass mounted and driveable to orbit an axis stationary with respect to the support synchronously with a part carried by said supporting means; said masses being mounted for rotation about parallel axes while in anti-phase relation at least when the respective planes including the centre of gravity and axis of rotation of each part are parallel or coincident; and means for adjusting the position of at least one of said components relative to the supporting means.

Thus in this new machine, it will be possible to change the value of the simulation imbalances applied to the crank-shaft by moving either one or both of the imbalance generating components, for example, by translation along the axis of rotation of the component or components, in such a way as to vary the distance between the axes of the said imbalances, that is to say the length of the projection on the clearance plane, of the spacing between the axes of rotation of the said imbalance generating components, and/or the modulus of the imbalances, that is to say the length of the projection on the clearance plane of each of the radii joining the centre of rotation to the centre of gravity of the respective mass. Each imbalance generating component is in effect equivalent to a point mass located at the centre of gravity and moving in a circular orbit in a plane perpendicular to the axis of rotation of the said component about a centre of rotation.

In the limiting case where the axes of the two components generating imbalance are identical, only the spacing between the axes of the imbalances can be varied.

Other characteristics and advantages of the invention will become apparent on reading the following description, given by way of indication and without implying a limitation, of two embodiments of the balancing machine according to the invention. This description refers to the accompanying drawings in which:

FIG. 1 is a schematic side elevational view of a first embodiment of crank-shaft balancing machine according to the invention;

FIG. 2 is a partial schematic view in transverse cross-section on line II—II of FIG. 1;

FIG. 3 is a partial schematic view in vertical cross-section on line III—III of FIG. 1;

FIG. 4 represents a variant of a detail of FIG. 3;

FIG. 5 is a schematic view in elevation showing the device which controls the movement of the cursor;

FIG. 6 is a partial schematic view in vertical cross-section along VI—VI of FIG. 5;

Figure 7:
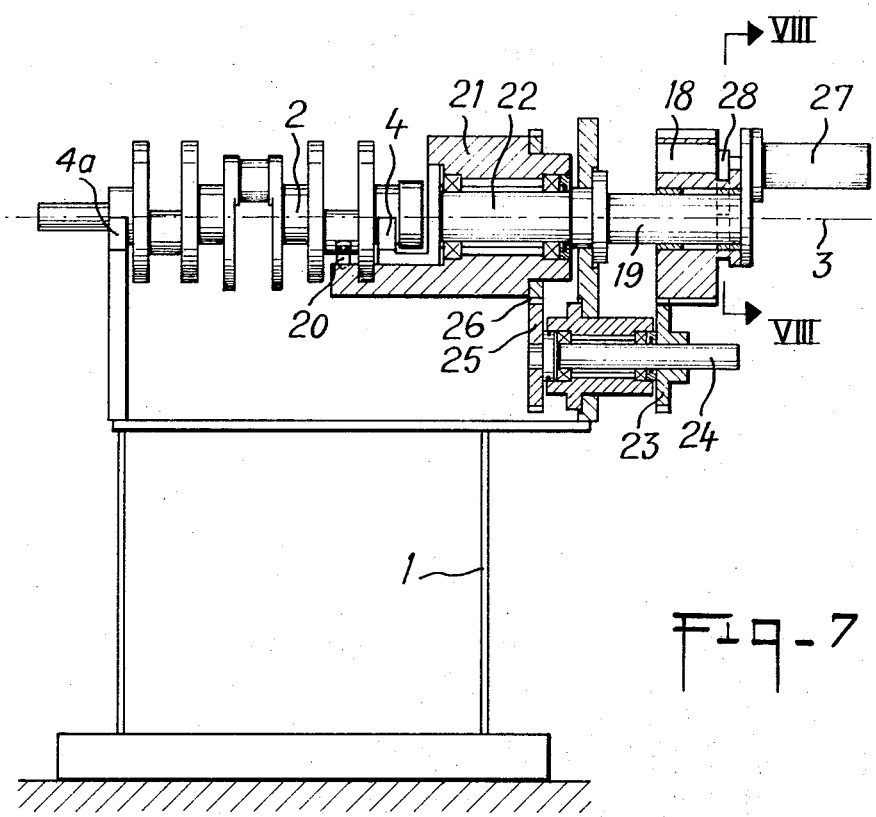
FIG. 7 is a schematic side elevational view of a second embodiment of machine for balancing crank-shafts according to the invention.

As can be seen in the drawings, the balancing machine comprises a support 1 on which is supported a crank-shaft 2 for rotation about its axis in such a way that the axis is free to move in a plane which is called the clearance plane, in the present case, the horizontal axial plane of the machine. For this purpose, the crank-shaft 2 rests on half-bearings 4a and 4.

The balancing machine comprises a crank-shaft drive means which in a first embodiment represented in FIGS. 1 to 6, comprise a cradle 5 connected for rotation with, on the one hand a drive shaft 6 via a universal joint 7 and a gear 8 and, on the other hand the crank-shaft 2 via a drive catch 9.

The balancing machine additionally comprises two components generating imbalance, each of which consists of a mass mounted to orbit about an axis firmly fixed to the base support 1. The said masses are driven synchronously with the crank-shaft 2 with their axes of rotation parallel to one another, and are adjustable relative to one another in such a way as to be permanently in opposed phases. Each generator has a plane which includes the axis of rotation of that generator and the equivalent point mass of that generator, and these planes are parallel. In the embodiment of FIGS. 1 to 6 the planes are coincident.

At least one of the imbalance generators, the so-called mobile generator can be moved relative to the support 1 in such a way that movement of the said mobile mass causes a variation of at least one of the following parameters: (i) the distance between the axes and (ii) the modulus of each imbalance generated, in order to simulate a dynamic imbalance of the crank-shaft 2 to be balanced.

In the particular embodiment represented in FIGS. 1 to 6, the mobile generator consists of a cursor 10 which can slide on a guide which is part of a support mounted to rotate about the axis of rotation of the said mobile generator and which is connected to the drive means. In particular, the guide is a bar 11 which joins the side-plates 5a and 5b of the cradle 5, and is parallel to the axis of rotation 3 of the crank-shaft 2. The bar orbits the axis 3 in phase with one of the imbalances to be produced in order to achieve simulation of a dynamic imbalance to which the crank-shaft 2 must be subjected in use. The revolving combination consisting of the cradle 5 and the bar 11 is balanced so that its residual imbalance is antiphase to the bar 11, so that the said combination 5, 11 forms a component generating imbalance, this being a component which consists of a mass mounted off centre to orbit an axis coaxial to the axis of rotation 3 of the crank-shaft 2 and driven synchronously with the rotation of the crank-shaft 2. The cursor 10 is mounted to slide along the bar 11 and has a mass and a shape such that it is suitable for compensating the static imbalance of the revolving combination 5, 11 when it is mounted on the bar 11. Thus, the cursor 10 forms the second imbalance generating component this being a component which consists of a mass mounted to orbit the same axis as the first imbalance generating component synchronously with rotation of the crank-shaft 2. The second component 10 can thus be moved, in the present case with a translational movement parallel to the axis of rotation 3 of the crank-shaft to be balanced. By this arrangement it is possible, by a simple movement of the cursor 10 along the bar 11, to vary the dynamic imbalance produced. The cursor 10 can be moved manually opposite an appropriate calilbration mark on the bar 11 and can be clamped by a grub screw 12 (see FIG. 3).

In an alternative form of cursor illustrated in FIGS. 4 to 6, the cursor 10 comprises a stop ball 13 urged into suitable slots 14 provided on the bar 11.

The cursor 10 can be moved on the bar 11 by means of two opposed control jacks 15, 16 whose piston rod ends are capable of coming into contact with the cursor 10 and of coming to rest on one of a set of indexing stops 17. The two jacks 15 and 16 are driven to move their piston rods together against both an indexed stop 17 and the cursor 10 to move the cursor to any position alongside the indexed stop 17, where the cursor will be held by the ball 13.

The set of stops 17 can be pre-positioned as a function of the type of crank-shaft 2 to be balanced, that is to say as a function of the path location and interaxial spacing of the axes of the intended cylinder bores, and of the mass of the connecting-rod bearings which have to be connected to the said crank-shaft 2, so that the jacks form control means capable of adjusting the translational position of the cursor 10 as a function of the type of crank-shaft 2.

Figure 8:
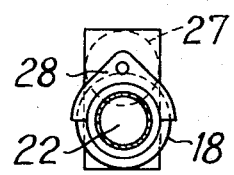
FIG. 8 is a partial schematic view in transverse cross-section on line VIII—VIII of FIG. 7.

In the embodiment of FIGS. 7 and 8, the mobile imbalance generating component consists of a sliding eccentric collar 18 mounted for axial and rotational movement on a shaft 19 which is firmly fixed to the support 1 and connected to suitable drive means. As can be seen in FIGS. 7 and 8, the crank-shaft 2 to be balanced rests on half-bearings 4a and 4 and is rotated by a catch 20 fixed to a drum 21 revolving about a shaft 22 which is fixed to the base support 1 and itself carries the half-bearing 4. The drum 21 is balanced in such a way that its residual imbalance is in phase with one of the imbalances to be produced in order to achieve simulation.

The shaft 22 is extended coaxially on the side opposite the crank-shaft 2 by the shaft 19 on which the eccentric collar 18 is slidably and rotatably mounted. The eccentricity of the collar 18 imparts thereto an imbalance equal to the residual imbalance of the drum 21. The eccentric collar 18 engages a control gear wheel 23 supported on a moving shaft 24 which also carries an identical second drive gear wheel 25 in engagement with a cogwheel 26 firmly fixed to the drum 21. The transmission train 18, 23, 24, 25, 26 is such that the drum 21 and the collar 18 are driven synchronously with the crank-shaft 2. The eccentric collar 18 is supported so that its imbalance is antiphase to the residual imbalance of the drum 21, so that the drum 21 and the collar 18 form the two imbalance generating components capable of producing a simulation dynamic imbalance. The sliding collar 18 forms the mobile component since it can be moved relative to the support 1. In the present case, as in the preceding embodiment, movement of the mobile component 18 is a translational movement parallel to the axis of rotation 3 of the crank-shaft 2 to be balanced.

Thus, by sliding the collar 18 axially, the desired change in dynamic imbalance is produced. In the example represented, this sliding is achieved by a jack 27 carrying a fork 28. As in the preceding embodiment, the jack 27 can be controlled as a function of the type of crank-shaft 2 to be balanced.

As a variant of the embodiment represented in FIG. 7, the eccentric collar 18 can also be driven in the opposite rotational direction from that of the drum 21. In this case, the equivalent off centre point mass of the drum 21 and that of the collar 18 must be adjusted relative to one another so that they will both be simultaneously in opposed phases and contained in one and the same plane parallel to the clearance plane and containing the common axis of rotation of the said masses, that is to say the axis of rotation 3 of the crank-shaft 2.

The invention can be applied to the balancing of any parts which have to be balanced statically but which must, moreover, retain a given dynamic imbalance as is especially the case for the crank-shafts of a number of reciprocating engines and of certain compressors.

We claim:

1. A balancing machine comprising:
means for supporting a part to be balanced for rotation about an axis and lateral movement in a plane called the clearance plane;
drive means for rotating the part to be balanced;
two components for generating imbalance, each of said components comprising a mass to orbit about an axis which is stationary with respect to the supporting means,
each of said masses having a plane defined by its centre of gravity and its axis of rotation,
means mounting said masses for rotation about parallel axes while in antiphase relation at least when said planes are parallel,
means driving said masses synchronously with the part to be balanced; and
means mounting at least one of said components for movement relative to the supporting means.

2. A balancing machine as set forth in claim 1, wherein said at least one component is a cursor and said means mounting the movable component comprises guide means, mounted for rotation about the axis of rotation about which said cursor orbits, said cursor being slidable along said guide means.

3. A balancing machine as set forth in claim 1, wherein the movable component comprises of an eccentric collar mounted for rotational and axial translational movement relative to said supporting means.

4. A balancing machine as set forth in claim 1, wherein the movable component is movable parallel to said axis of rotation of a part supported by said supporting means.

5. A balancing machine as set forth in claim 1 and further including control means for adjusting the position of said at least one component.

6. A balancing machine as set forth in claim 5, wherein said control means comprises at least one jack positioned to abut said movable component when operated, and said jack control means controls the position of the said movable component as a function of the type of part to be balanced.

7. A balancing machine comprising:
means for supporting a part to be balanced for rotation about an axis and lateral movement in a plane called the clearance plane;
drive means for rotating the part to be balanced,
two components for generating imbalance, each of said components comprising a mass to orbit about an axis which is stationary with respect to the supporting means,
each of said masses having a plane defined by its centre of gravity and its axis of rotation,
means mounting said masses for rotation about parallel axes while in antiphase relation at least when said planes are parallel,
means driving said masses synchronously with the part to be balanced; and
means mounting at least one of said components for movement therealong relative to the supporting means.

* * * * *

UNITED STATES PATENT AND TRADEMARK OFFICE
CERTIFICATE OF CORRECTION

PATENT NO. : 3,871,234
DATED : March 18, 1975
INVENTOR(S) : Christian Langlois

It is certified that error appears in the above-identified patent and that said Letters Patent are hereby corrected as shown below:

In the Claim for Priority, the correct filing date of the French application No. 72.36177 should be:

--October 12, 1972--.

Signed and Sealed this

Third Day of August 1976

[SEAL]

Attest:

RUTH C. MASON
Attesting Officer

C. MARSHALL DANN
Commissioner of Patents and Trademarks